(No Model.)
W. SPITZNASS.
TRANSPLANTER.
No. 273,181. Patented Feb. 27, 1883.
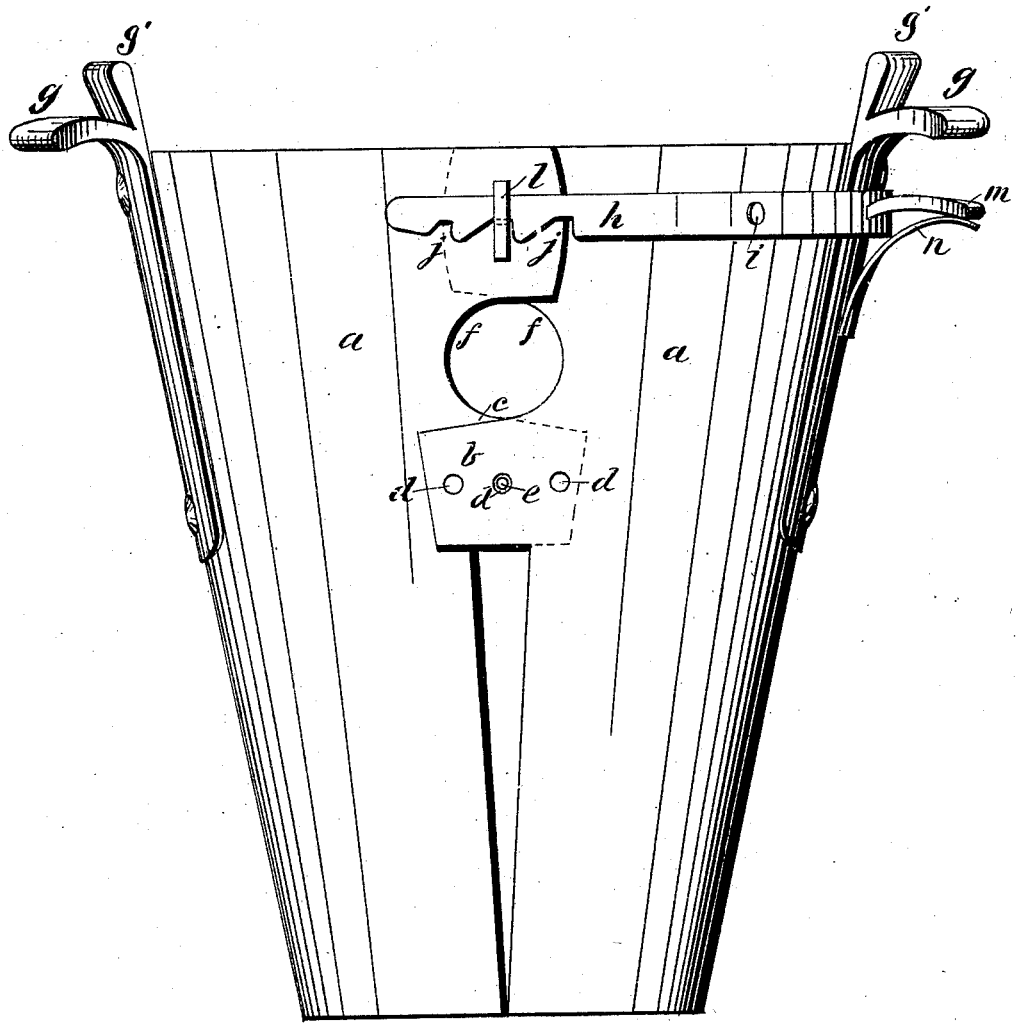
WITNESSES:
Chs. T. Howell,
C. Sedgwick
INVENTOR:
W. Spitznass
BY Munn & Co.
ATTORNEYS.
N. PETERS. Photo-Lithographer, Washington, D. C.

UNITED STATES PATENT OFFICE.

WILLIAM SPITZNASS, OF NEW ATHENS, ILLINOIS.

TRANSPLANTER.

SPECIFICATION forming part of Letters Patent No. 273,181, dated February 27, 1883.

Application filed October 19, 1882. (No model.)

*To all whom it may concern:*

Be it known that I, WILLIAM SPITZNASS, of New Athens, in the county of St. Clair and State of Illinois, have invented a new and Improved Transplanter, of which the following is a full, clear, and exact description.

My invention consists of a pair of concavo-convex plates of nearly semi-cylindrical form at one end, but narrower at the other, pivoted together by strap-ears near about the middle of the edges of said plates, to enable them to be extended and contracted at the respective ends, said plates being provided with a latch device, to secure the ends which enter the ground in the contracted position for raising the plants together with the necessary surrounding earth, the said parts being detachable and adjustable at the pivot-joints for adapting the device to the size of the plants, and for enabling the parts to be applied separately to the plants when necessary for the protection of the branches, and then be connected to raise the plants, as hereinafter fully described.

Reference is to be had to the accompanying drawing, forming part of this specification, in which is shown a perspective view of my improved transplanter.

I make the half-circular plates $a$ of sheet metal, and pivot them together, near about the middle along the edges, between the top and bottom, by strap-ears $b$ and $c$, one having a series of holes, $d$, so that they can be readily sprung together or apart at any time. The edges of the plates $a$ are notched at $f$, in order that the operator may, when necessary, insert his fingers thereat to discharge the earth in case it is too sticky to fall out. By this connection of the parts of the device it may be readily adjusted as to size, and it will be seen that by separating the parts each may be inserted in the earth separately from the other on the opposite sides of the plant when the branches would be injured by the application of the connected device, and the parts may then be connected and used the same as when connected to begin with. The lower ends are to be swung apart by partially closing the upper ends, and preparatory to inserting the device in the ground to remove the plant. When inserted, the lower ends are to be pressed toward each other by extending the upper ends to hold the contents until placed in the cavity made with the same tool beforehand, and therefore closely fitting, or in a pot, where the contents are to be discharged, when the bottom is opened by closing the top, and the device lifted away; or the opening may be effected by detaching the pivot-joints at the sides. The handles have two bifurcations or prongs, $g$ $g'$, the former arranged horizontally and the latter vertically. Handles $g$ are attached to the upper ends of the parts $a$, by which to work the device, and in order to fasten it with the lower ends in the contracted position, when the contents are to be retained a while, I have provided the latch-bar $h$, which is pivoted to one of the parts at $i$, and has a series of notches, $j$, near the ends, which engage with a stud, $l$, attached to the other part. Near one of the handles $g$, along which the latch passes, said latch is provided with a finger-piece, $m$, by which it may be readily pressed down with one of the fingers of the hand which holds said handle, to allow the device to open at the bottom for the discharge of its contents, and below said finger-piece is a spring, $n$, to keep the latch in engagement with the stud $l$ until it is desired to disengage it.

The operation is as follows: The thumb is placed over the handle-prong $g$ and the fingers pressed on the latch-finger piece $m$, so as to unlock the latch and spread the lower ends of sections $a$ $a$ until the latter became about parallel and in a perpendicular position, when the transplanter is pressed down into the soft soil around the plant. The operator then pulls on the opposite prongs, $g'$, in an outward direction until the soil is compressed around the roots of the plant and the earthy particles made to stick together, so as to rise with the plant and not become disintegrated after the transplanter has been removed. In pulling apart the prongs $g'$ $g'$, in order to condense the soil around the roots, the latch $h$ will slide back automatically over the lug or keeper $l$ and lock itself against a reverse movement.

Having thus described my invention, what I claim as new, and desire to secure by Letters Patent, is—

1. A transplanter provided on each side with a bifurcated handle, $g\ g'$, adapted to be used as described.

2. The end notched bars, $h$, pivoted at $i$ on one section, $a$, in combination with a keeper, $l$, on each side of the other section, whereby the bar is both locked on and guided by the said keeper, as shown and described.

3. The two sections of a transplanter provided respectively with the strap-ears $b\ c$, the former having a series of holes, $d$, and the latter a stud-pin, $e$, whereby they may be pivoted together at different distances apart, as described.

4. The combination of the finger-piece $m$ with the latch $h$, said finger-piece being relatively arranged with one of the handles $g$, substantially as described.

5. The combination of the spring $n$, latch $h$, and the parts $a$ of the transplanter, said parts being pivoted together, substantially as described.

WILLIAM SPITZNASS.

Witnesses:
 ISFRIED PROBST,
 LOUIS SCHENCK.